UNITED STATES PATENT OFFICE.

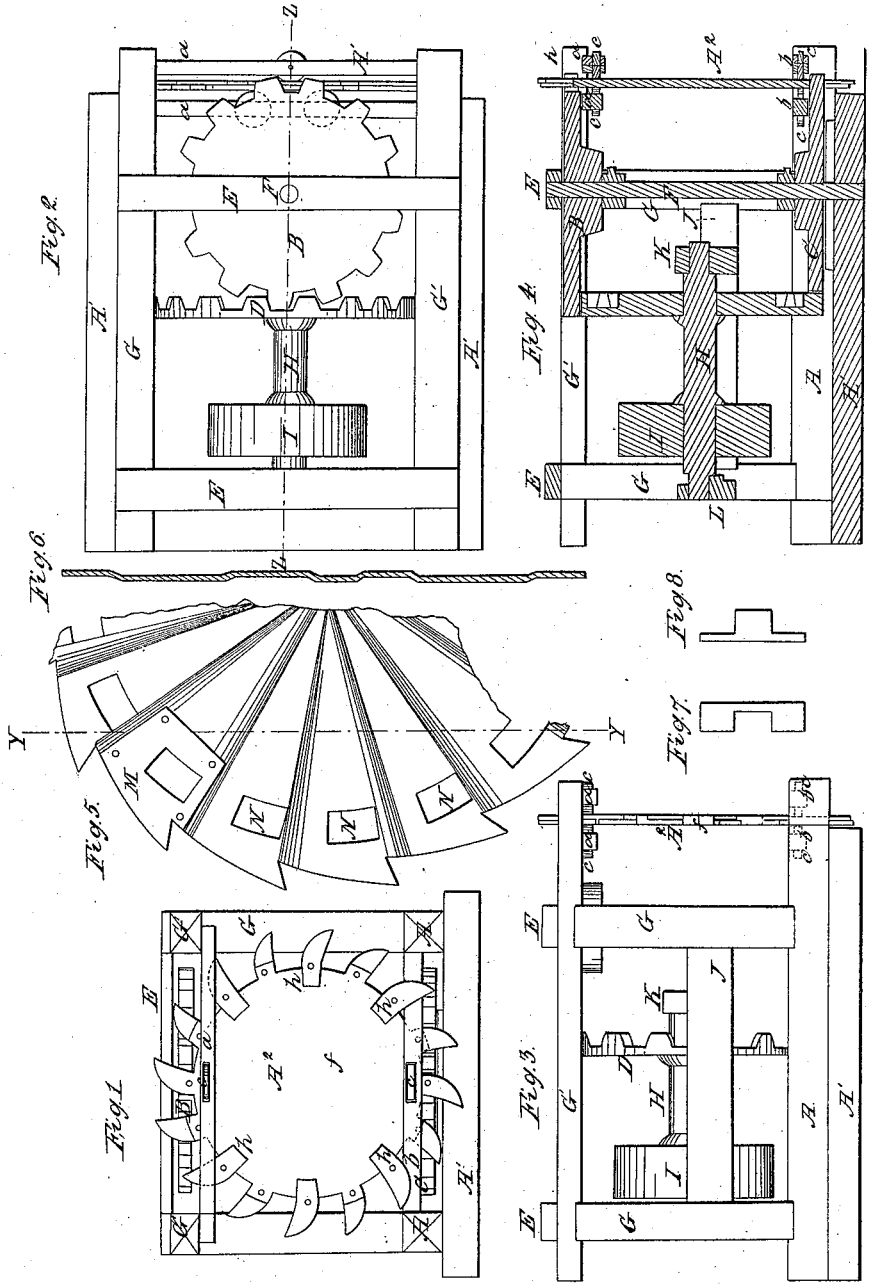

THOMAS J. FLANDERS, OF MANCHESTER, NEW HAMPSHIRE.

CONSTRUCTION AND MODE OF DRIVING CIRCULAR SAWS.

Specification of Letters Patent No. 12,126, dated January 2, 1855.

*To all whom it may concern:*

Be it known that I, THOMAS JEFFERSON FLANDERS, of Manchester, in the county of Hillsborough and State of New Hampshire, have invented certain new and useful Improvements in the Construction and Operation of Circular Saws; and I do hereby declare that the same are described and represented in the following specification and drawings.

To enable others skilled in the art to make and use my improvements I will proceed to describe their construction use and operation referring to the drawings in which the same letters indicate like parts in each of the figures.

Figure 1, is an end elevation; Fig. 2 a top view. Fig. 3 is a side elevation; Fig. 4, is a section through the line $z\ z$ of Fig. 2. Fig. 5, represents a portion of a saw and Fig. 6, a section of the same through the line $y\ y$.

The nature of my invention consists in supporting a circular saw edgewise, and operating it at the same time by means of two spur gears, so arranged that the teeth of the gears act between the teeth or in holes made for that purpose in the plate of the saw which is supported sidewise by guides, so that the saw is operated by the gears, and supported by the gears and guides so as to dispense with the shaft heretofore used, and in crimping or corrugating the plates of saws so as to make them stiffer in proportion to the thickness of the plate and so as to reduce the friction of the saw in the score; and in making the teeth of crimped saws separate from the plate and riveting them into the hollows formed by crimping so that the saw may be supported and steadied by roller guides. Lastly in making the teeth one half the thickness of the plate or less by taking off the side of one tooth and the opposite side of the next, so that the teeth will only cut one half the thickness of the saw kerf or less so as to leave room for the escape of the chips so that the saw can be run faster without heating and execute a given quantity of work with two thirds of the power.

In the above mentioned drawings A A are two sills which should be placed on a solid foundation A′ and connected together by the bars $b\ b$ as represented. The posts G G are framed into the sills A, and into the rails G′, G′, which rails are connected together by the bars E E to constitute a frame to which the other parts are connected. There are two side bars J over the sills A fastened to the posts G G which side bars support the cross bar K which is perforated for one end of the shaft H to turn in the other end being fitted to turn in the cross bar L between the posts G G. The shaft H is provided with a pulley I, to which a belt may be applied to turn it and operate the face gear D fastened to it; which gear drives the spur gears B and C, both of which gears turn freely on the shaft F which shaft F is held and supported in a proper position by the foundation A′ and the bar E as represented in Fig. 4.

The circular saw $A^2$ is provided with projections as represented to which the teeth $h\ h$ are riveted which teeth are fitted to recesses made alternately in each side of the saw plate to one half the thickness of the plate; the projections and teeth being only one half the thickness of the plate also. This saw $A^2$ has no shaft, the teeth and projections to which they are fastened are made to correspond with the teeth of the spur-gears B and C, which act between the teeth of the saw and propel it; the latter supporting the saw edgewise to keep it from dropping while the guide rollers $c\ c$ in the bars $a\ a$ fastened to the rails G′ and also similar rollers $c\ c$ in the bars $b\ b$ support and steady it sidewise, while it cuts a score in a log which, may be forced against it by such devices as may be convenient.

During a pretty long experience in operating circular saws I have frequently had the saw to set or stick fast in the log, so that I could not turn it nor run the log back, and have therefore been compelled to raise the log up off of the saw, when I have found the spaces between the teeth packed full of chips jammed so compactly together that they were more solid, or harder than the wood from which they were cut; hence I came to the conclusion that the friction resulting from pressing the chips so hard and forcing them through or out of the score, produced the heat that is so much complained of and which expands the outer part of the saw and makes it buckle and vibrate; and I concluded that if I could provide room or space for the chips or sawdust it would effectually overcome the difficulty. I accordingly reduced the teeth to one half the thickness of the saw plate, and less than one half of the thickness of the saw kerf or score cut by the saw, by taking off the side of one tooth and the opposite side of the next, so that the outside of the teeth will mark in a plane with, or against the sides of the score cut and leave one half of the width for the chips, thereby increasing the space for the chips and making them one half as thick or less than they were before the teeth were reduced in thickness; this remedied the defects complained of, and the saw run at a higher speed without heating, and performed a given quantity of work with less than two thirds of the power required before. Notwithstanding the reduction of the teeth to one half the thickness of the plate or less, I set the points off a little and if a feather of wood is formed in the center of the score it is cut away by the sides of the teeth. In pursuing this course of experiments I took a small saw and filed radial scores alternately upon each side, so as to remove about one half of the thickness of the saw, and at the same time removing nearly one half of the wearing surface of the saw upon each side so as to reduce the friction of the saw and make a space for the fine chips to escape so that the saw might be run at a high speed without heating. As this mode of scoring a saw plate was very expensive and difficult, I took a thin saw plate and crimped or corrugated it as represented in Figs. 5 and 6, by pressing it between two dies fitted for the purpose, so as to bend or crimp it into the form represented; and then making the teeth to correspond with the scores in the plate formed by crimping it; the points of the teeth being made or bent level with the highest part of the bends formed by crimping, alternately upon each side, so that the saw will run with very little, or without any setting, and still run without heating in some kinds of sawing; although it may be best or necessary to set it for other kinds.

A crimped saw plate may be made far thinner than a straight one, yet after it is crimped it will be found stiffer than a straight plate that cuts the same thickness, besides it will run with far less friction and be less liable to heat and buckle, for it is confidently believed that the crimping will remedy the buckling entirely and also the vibration which is the result of buckling. A crimped plate may be made without teeth so that the teeth may be riveted into the scores like the one represented at M in Fig. 5, and if the teeth riveted in are made to fill the score even with the high parts of the bends on each side the saw may be run between the roller guides c c; but unless the scores in a crimped saw are filled by riveting in teeth or in some other way; it will not run well between roller guides; the rollers must be removed and their places supplied by guides with straight surfaces, Figs. 7 and 8, long enough to reach across two or three bends or scores in the plate of the saw.

Instead of making the gears to propel a saw by acting between its teeth the plate of the saw may be provided with a circular row of holes N N Fig. 5, to correspond with the teeth of the gears through which they may act to propel the saw. When saws are propelled by spur gearing acting upon the plate of the saw the guides may be arranged to support and steady the saw near where it enters the log to cut it so as to prevent the saw from being swerved by knots, cross grained or hard places in the wood sawed. When saws are crimped as above described and the points of the teeth are formed upon the highest part of the bends they will run with but little if any setting and the bends in the saw will run in contact with the sides of the score which will steady and support the saw and prevent it from being swerved by hard places in the wood. I contemplate that reciprocating saws may be crimped to great advantage so as to make them stiffer in proportion to the weight of metal and also that they will run easier or with less friction against the sides of the score.

What I claim as my invention and desire to secure by Letters Patent is—

1. Supporting a circular saw edgewise and operating it at the same time by means of two spur gears or their equivalents arranged and operated at right angles to the saw so that the said gears act upon the plate of the saw between the teeth or through holes in the plate to propel and support it edgewise at the same time as described thereby dispensing with the shaft or its equivalent heretofore used to propel and support the saw.

2. Crimping or corrugating the plates of saws substantially as described, so that they will require little or no setting and to make them stiffer, also that the bends may run in contact with the sides of the score cut and support and steady themselves so as to be less liable to be swerved by knotty, cross grained or hard places in the wood or material sawed, and at the same time run with less friction and power.

3. Making the teeth of crimped or corrugated saws separate from the plate, and fastening them into the recesses formed by the crimping or corrugating or between the bends in the plate of the saw, so that the saw may be supported and steadied by roller guides or otherwise substantially as described.

4. Making the teeth of saws one half the thickness of the plate or less, by taking off the side of the tooth and the opposite side of the next tooth as described, so that they will cut one half or less than one half the thickness of the saw kerf, so that the saw will run at a higher speed without heating and execute a given quantity of work with two thirds or less, of the power heretofore required substantially as described.

THOS. J. FLANDERS.

In presence of—
G. W. MORRISON,
C. W. STANLEY.